Nov. 18, 1924.

R. C. WILLARD 1,515,982

WINDSCREEN FOR ROAD VEHICLES

Filed Nov. 7, 1922    5 Sheets-Sheet 1

Inventor—
Robert Charles Willard.
By B. Singer. Atty.

Nov. 18, 1924.  1,515,982
R. C. WILLARD
WINDSCREEN FOR ROAD VEHICLES
Filed Nov. 7, 1922     5 Sheets-Sheet 2

Inventor-
Robert Charles Willard,
By- P. Amiger. Atty.

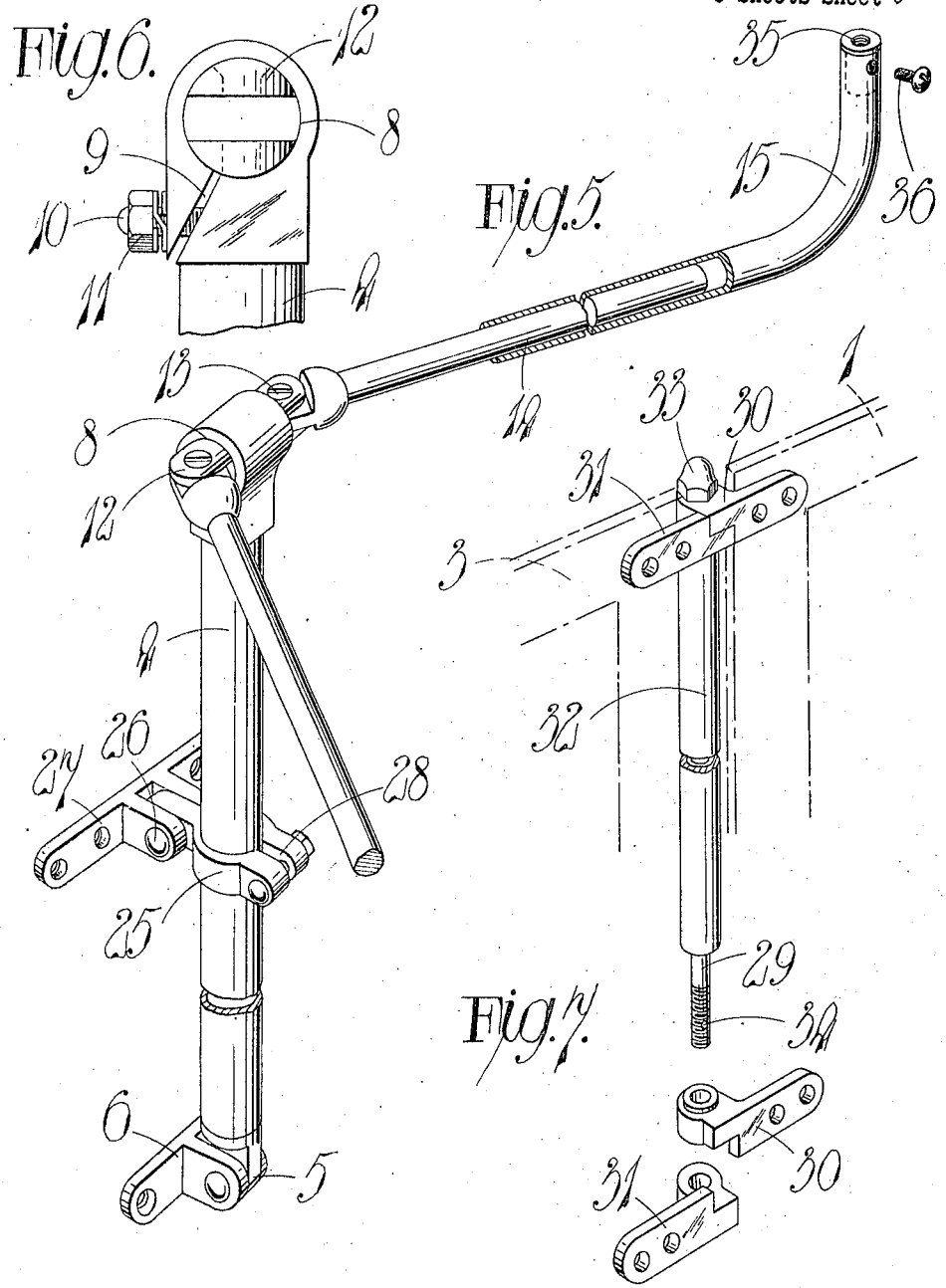

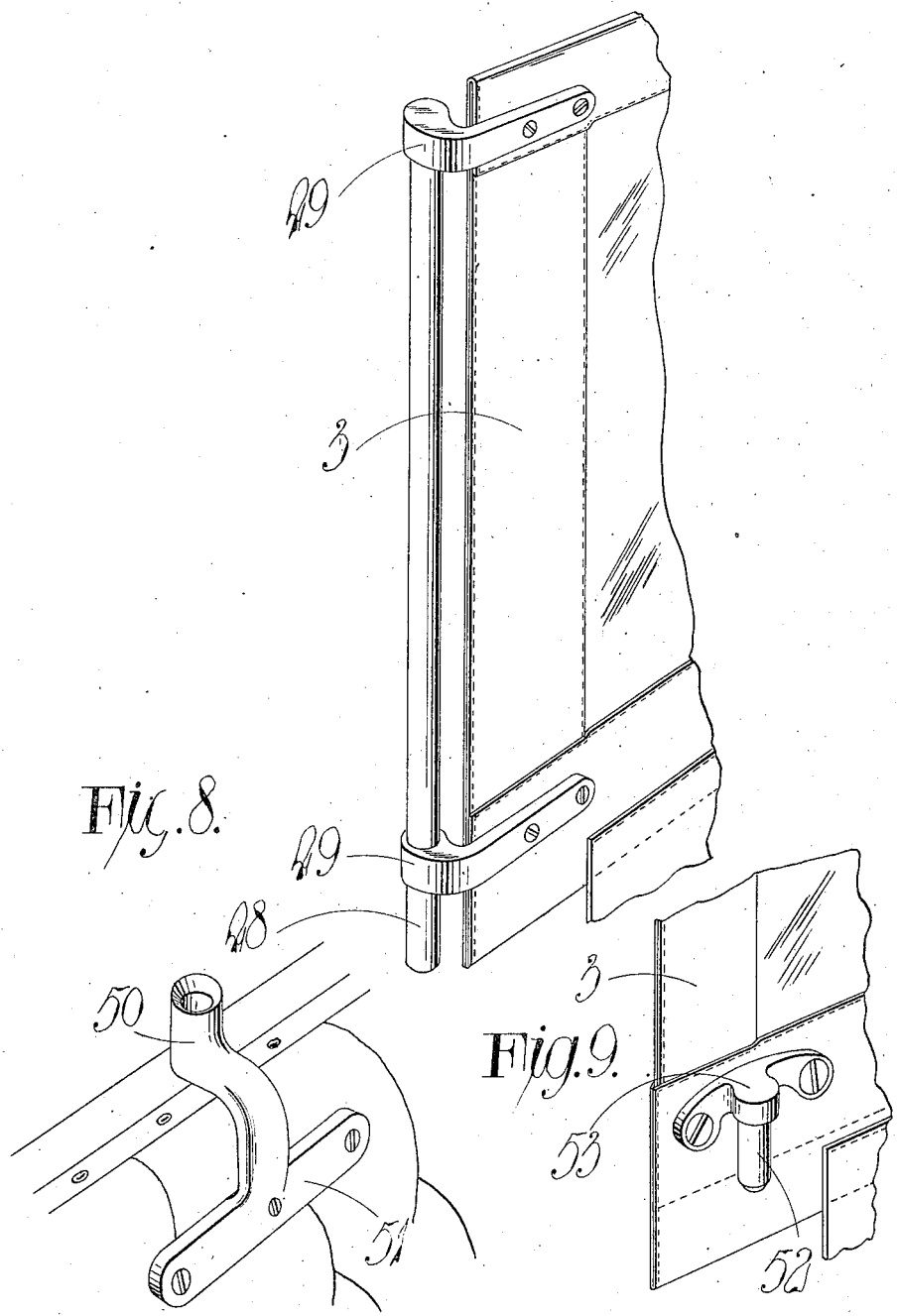

Nov. 18, 1924.
R. C. WILLARD
1,515,982
WINDSCREEN FOR ROAD VEHICLES
Filed Nov. 7, 1922     5 Sheets-Sheet 5
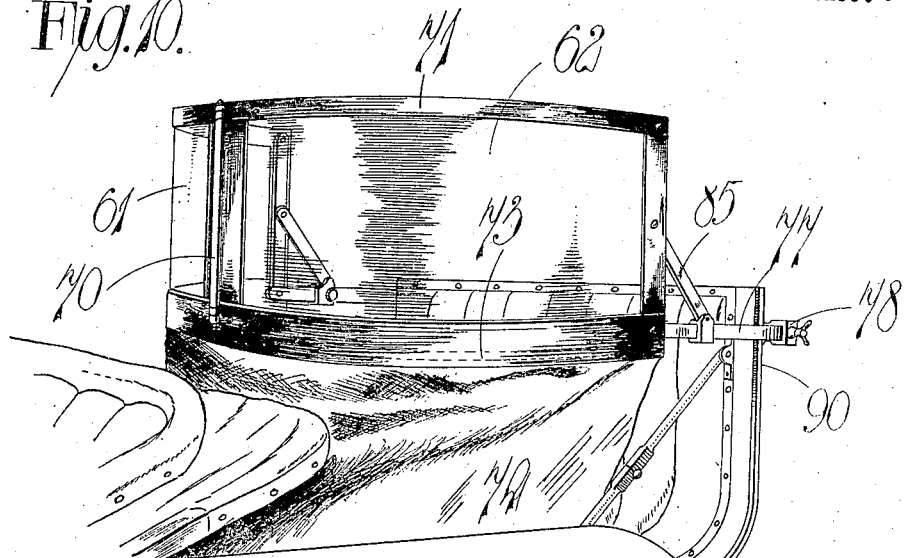
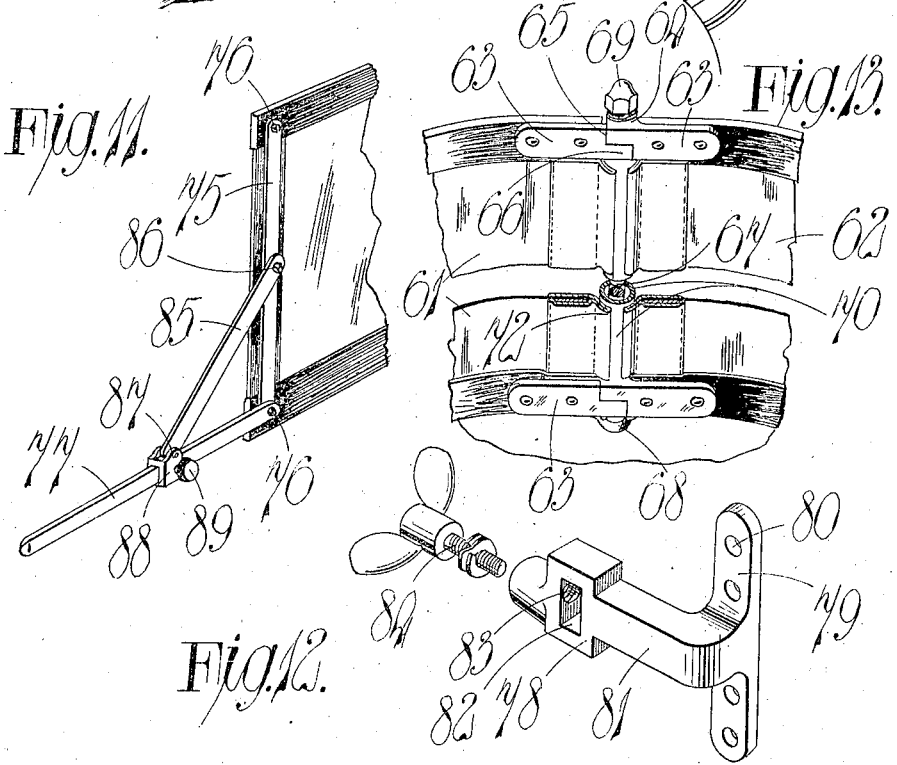

Patented Nov. 18, 1924.

1,515,982

UNITED STATES PATENT OFFICE.

ROBERT CHARLES WILLARD, OF BIRMINGHAM, ENGLAND.

WINDSCREEN FOR ROAD VEHICLES.

Application filed November 7, 1922. Serial No. 599,549.

*To all whom it may concern:*

Be it known that I, ROBERT CHARLES WILLARD, subject of the King of Great Britain, residing at 132 Steelhouse Lane, Birmingham, in the county of Warwick, England, have invented certain new Improvements in Windscreens for Road Vehicles; and I do hereby declare the following to be a full, clear, and exact description of the same.

This invention relates to wind screens for road vehicles and is primarily intended for application to the rear seats of such vehicles.

One of the objects of the present invention is to provide a generally improved arrangement of fittings whereby the screen is not only adjustable towards and away from the occupants of the vehicle, but is rigid and firm in its extended position.

A further object is to provide a screen which is applicable to bodies of different kinds and of largely varying widths.

A further object is to provide a screen of generally improved construction which can be folded away to occupy a minimum of space, but which, when extended, will give adequate protection to the passengers of the vehicle.

My invention is applicable to screens of rigid construction or to screens which are of horizontal flexible construction as described in the prior Patent No. 1,343,440.

A screen according to this invention is applicable either to the rear seats or to what is known as the "dickey" seat of motor vehicles.

Referring to the drawings:—

Figure 5 is a perspective view showing the forward support of the screen.

Figure 6 is a detail view in side elevation.

Figure 7 is a perspective view showing the method of hinging together the sections of a screen.

Figure 8 is a perspective view showing one edge of a screen provided with a spigot and socket connection to the side of the car.

Figure 9 is a perspective view showing another spigot arrangement.

Figure 10 is a perspective view of a modification.

Figure 11 is a fragmental perspective view of the end fitting.

Figure 12 is a perspective view of the attachment member.

Figure 13 is a fragmental perspective view of the hinge.

Figure 1:
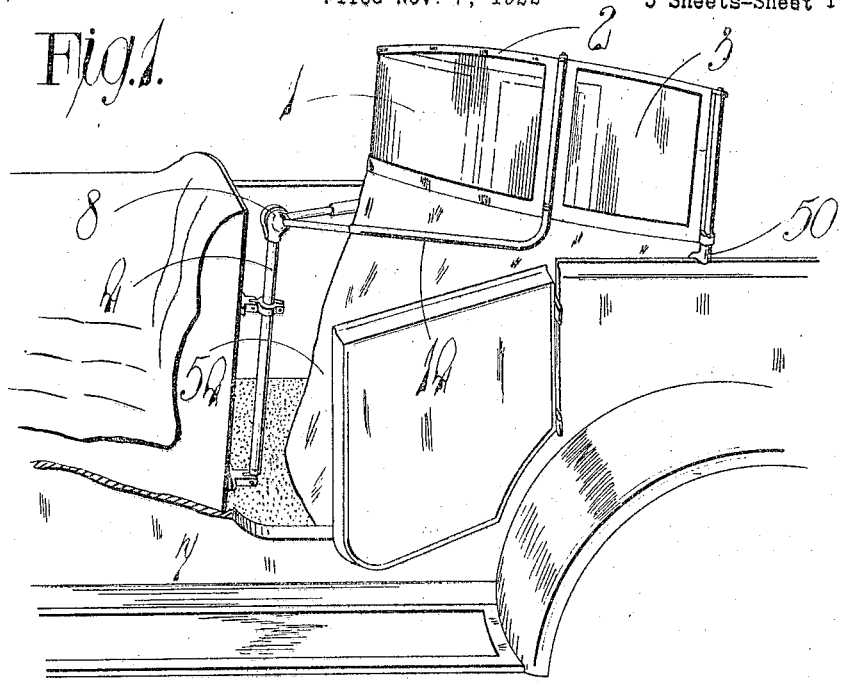
Figure 1 is a perspective view showing a screen according to the present invention applied to the rear part of a motor car.
Figure 2:
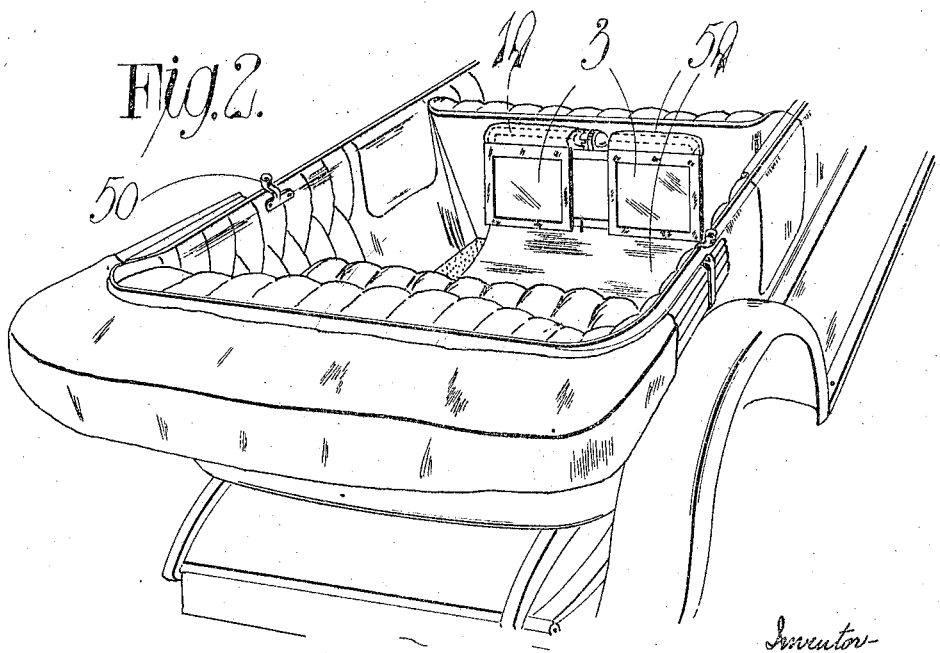
Figure 2 is a perspective view showing the screen in its folded position.

In the construction illustrated in Figures 1 to 7, the screen itself is made in three parts, the central portion 1 comprising a sheet of celluloid having substantially rigid members at its vertical edges and flexible resilient bands of metal at its upper and lower horizontal edges. These strengthening members at the edges are preferably enclosed in a leather binding 2 as described in the prior patent referred to.

The side wings 3 of the screen are also preferably made of flexible celluloid and may be provided with resilient or stiffening members at the edges if desired. The side wings are hinged to the vertical edges of the central portion of the screen.

The support for the central portion 1 of the screen comprises a rod or tube 4 adapted to be secured by a hinge 5 at its lower end to a plate 6 adapted to be fastened to the floor 7 of the car to the rear of the centre of the front seat or to the back of the seat. The provision of the hinge 5 at the lower end of this rod or tube 4 enables the fitting to be applied to various makes of car or vehicle, some of which may have inclined foot boards at the particular place where it is necessary to secure this fitting. This rod or tube 4 may be made in two parts fitting telescopically one within the other and its length can be adjusted more or less permanently to suit the vehicle by a contracting clip.

Intermediate its ends the rod or tube 4 may be supported by a pivoted eye 25 pivoted at 26 to a bracket 27 secured to the back of the front seat of the vehicle. The fact that the fitting 25 is pivoted permits of the easy application of the whole fitting to various designs and makes of car. The eye 25 is split at 28 so that it can be adjusted to any suitable position along the length of the rod or tube 4.

At the upper end of this rod or tube 4 is provided an eye 8 which is split at 9 and provided with a stud 10 and nut 11 whereby it may be tightened on to a double fork 12. This fork 12 can be rotated on its own centre when the nut 11 is loosened.

To this double fork 12 are pivotally attached on vertical pivots 13 two tubular telescopic arms 14. These arms extend obliquely in relation to the centre line of the car and each has its rear end provided with an upwardly curved portion 15 secured to the lower corners of the central portion 1 of the screen.

In the construction shown in Figure 7 the two sections 1 and 3 of the screen are shown hinged upon a pin 29. The central section 1 of the screen is provided with butt hinge parts 30 and the side flap 3 is provided with butt hinge parts 31. The butt hinge parts 30 and 31 engage on the pin 29 and between the butt hinges is a tube 32.

The pin 29 is provided with a head 33 and its lower end is provided with a hole 34.

Figure 3:
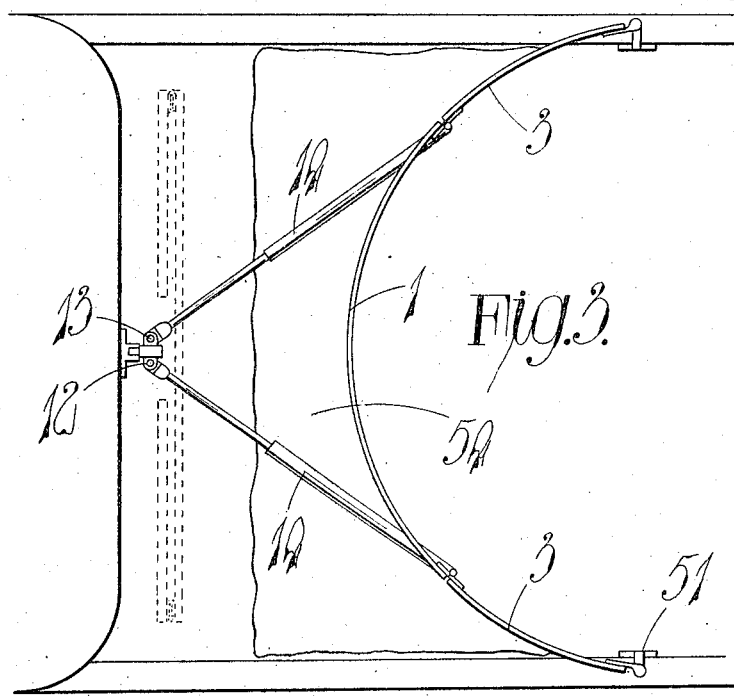
Figure 3 is a plan view showing in full lines the screen in an extended position and in dotted lines, the screen in a folded position.
Figure 4:
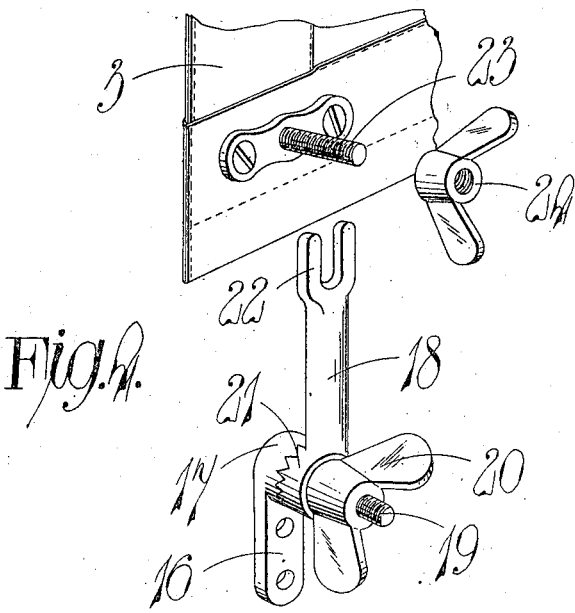
Figure 4 is a perspective view showing one method of connecting the rear corners of the screen to the sides of the vehicle.

This arrangement of butt hinging allows the screen to be folded so that the sections lie one upon the other but when the screen is extended the hinges cannot be turned beyond the position in which the sections are in alignment. Thus if the sections are moved into alignment and the outer edges of the screen are grasped, the screen as a whole can be bent into the curved shape as shown in Figures 1 and 3.

The lower ends of the pins 29 fit into socket like parts 35 at the ends of the telescopic arms 14. The ends 35 may be provided with screwed sockets which are adapted to screw on to the lower ends of the pins 29. A set screw 36 may be provided in each case for locking the pins 29 to the arms 14.

Instead of forming the upper end of the arm 18 as a fork it may be provided with a socket for receiving a spigot provided at the end of the screen. In order to allow the socket to take up a substantially vertical position for receiving the spigot, it may be pivoted to the end of the arm 18 and means may be provided for locking it in correct angular relationship with the arm.

An alternative method of connecting the edges of the screen with the sides of the vehicle is shown in Figure 8 wherein the edge of the screen is provided with a rod or spigot 48 attached to the screen by brackets 49. With this arrangement the sides of the vehicle will be provided with sockets 50 having attachment portions 51 and the screen may be supported and retained in its bent position by the engagement of the spigots 48 with the sockets 50.

In Figure 12 the lower corner of the screen is shown provided with an alternative form of spigot 52 having an attachment portion or bracket 53.

In those constructions where the connection between the ends of the screen and the sides of the vehicle take the form of a spigot which enters a socket, it will be observed that the screen can be extended into its operative position or it can be folded away without it being necessary to unscrew any nuts or release any fastenings of a similar nature. If a flexible screen is used which is bent into a curve, the tendency of the screen to straighten itself will cause the spigots to bind in the sockets which receive them, rendering any other retaining or securing device unnecessary.

The fitting described permits of the screen being moved from side to side about the pivots 13 and it also provides a means whereby the screen can be moved towards or away from the passengers in the rear seats by adjusting the rear fittings and pushing in the telescopic arms.

When the screen is not required for use the telescopic members may be turned forwardly until they are in alignment. The side wings 3 of the screen can then be turned inwardly so that they lie flat against the central panel or panels. The whole screen can then be revolved downwardly about the telescopic arms as a pivot until it lies flat at the back of the front seat and below the level of the top of the back of the front seat, all in a well known manner.

The lower edge of the screen may be provided with an apron 54.

In the modified construction illustrated in Figures 10 to 13 the screen comprises two flexible panels 61—62 which are constructed in the manner described in the prior patent referred to.

These two panels are of rectangular shape with the long sides extending horizontally and the shorter side vertically. Two of the shorter sides are provided at the top and bottom with attachment plate members 63 having outwardly extending lugs 64 by which the screen is hinged together. The extending lugs are only half as wide as the attachment plate and are so arranged that when the two panel members are brought together in their correct relative positions, the lug on the one attachment portion will come opposite the shoulder or end face 65 which is left above or below the lug on the opposite attachment portion, and the lug is provided with a projection or abutment 66 to engage with this edge or shoulder so as to form a butt hinge. The projection 66 on the lug is adapted to contact with the shoulder or edge upon the attachment plate when the two panels are in alignment.

The panels are hinged together by means of a pin or rod 67 which extends upwardly through holes in the projecting lug members, and this pin or rod is secured by a head 68 at one end and a nut 69 which is adapted to screw upon the opposite end, a tubular member 70 being provided which is adapted to extend between the upper and lower lugs of the attachment members round the vertical rod or pin 67.

As previously stated, the screen is formed in accordance with the aforementioned prior patent and consists of a sheet of celluloid having a leather or equivalent framing 71 which is suitably stiffened and the edge or end of the leather or equivalent framing adjacent the hinge is extended at 72 so as to lie closely around the tubular member and thereby exclude any draught.

Also, the rear or lower edge of the leather framing may be provided with a downwardly extending flap 73 to which the apron member 74 is adapted to be secured.

The remaining ends of the panels are provided with a vertically disposed rigid member 75 which is secured at its upper and lower edges to the framing of the screen by the nuts 76. Pivotally mounted upon this vertical rigid member is disposed the bar or arm 77 by which the screen is mounted. This bar or arm is pivotally mounted upon the member which secures the lower end of the vertically disposed rigid member to the screen.

The attachment member 78 for this bar or arm is shown at Figure 12 and comprises an attachment portion 79 having holes 80 for the reception of screws and an outwardly extending and crank lug portion 81 which is provided with an opening or slot 82 in its outer end which is shaped to correspond with the bar or arm. This outwardly extending lug portion is provided with a hole 83 into which is adapted to screw a wing or other suitable nut 84 by which the arm can be firmly secured to the attachment member.

The stay member consists of a link 85, one end of which is pivotally mounted to the vertically rigid member 75 at the part 86 about the centre thereof and the outer end is pivoted to the projecting lug portion 87 of a slide member 88 which is disposed upon the arm. This slide is provided with a knurled set screw 89 or any other similar device by which it can be secured in any suitable position along the length of the arm member.

In use as applied to the "dickey" seat of a motor car to which it is more particularly applicable, the attachment member 78 for the arm 79 by which the screen is mounted is secured at the side 90 of the rear face of the seat adjacent its upper end speaking relative to its open position as shown in Figure 10. In this position the projecting lug is adapted to extend laterally. The screen is now taken by the passenger of the "dickey" seat in such a position that the screen can be folded forwardly but will be prevented by the butt hinge from being folded backwardly relative to the position in which the panels are substantially in alignment so that any movement of the screen backwardly will cause it to take a curved shape or form.

When in this position the arms 77 by which the screen is to be mounted are successively placed within the opening or slot 82 in the attachment member and are secured by the wing nut 84 when the screen is rigidly mounted in position. It will be understood that by detaching one of the arms from the attachment member, the corresponding edge or end of the screen may be moved forwardly to allow free ingress and egress to the "dickey" seat by the passenger.

Further, the position of the screen can be altered horizontally by sliding the arm and the attachment member, and the screen can be tilted into a position above the head of the passenger so as to give a greater amount of protection by sliding or otherwise moving the stay member relative to the arm.

It will be understood that when not required for use, the panels of the screen may be folded about the hinge and the fittings folded up and the whole of the screen and fittings can be wrapped by the waterproof apron and disposed or stored away within the "dickey" seat.

What I claim then is:—

1. A wind screen for road vehicles comprising a plurality of panels of transparent flexible material, a flexible framework surrounding each transparent panel, butt hinges connecting said panels together to permit the panels to fold in one direction but not in the other, and means carried by the end panels for securing said screen to the sides of the vehicle.

2. A wind screen for road vehicles comprising a plurality of panels of transparent flexible material, a flexible framework surrounding each transparent panel, butt hinges connecting said panels together to permit the panels to fold in one direction but not in the other, a pair of forwardly converging telescopic arms supporting a central panel, a member carrying pivots for the forward ends of said arms, whereby the arms may be turned to allow the screen to be moved longitudinally of the vehicle until the arms are in alignment when one of the telescopic portions of each arm can be turned about its axis to allow the screen to fold down within the vehicle, an upright member supporting said pivot carrying member, and means for detachably securing each end panel to the side of the vehicle in the extended position of the screen.

3. In a wind screen for vehicles, the combination of a plurality of flexible transparent panels; hinges uniting said panels together in such manner that the panels can be collectively bent in one direction but permitting the panels to be folded over on top of each other when so desired, and means for detachably securing the ends of the screen to the vehicle, substantially as set forth.

4. In a wind screen for vehicles, the combination of a plurality of panels of transparent flexible material; butt hinges connecting said panels together to permit the panels to fold in one direction but not in the opposite direction; and means carried by the end panels for securing said screen to the sides of the vehicle.

5. A wind screen for vehicles comprising a transparent flexible screen, having a plurality of panels and means uniting said panels together in such a manner that the panels can be collectively bent; and means for detachably securing the ends of the screen to the vehicle in their bent condition, whereby the re-action due to the flexing of the screen causes the detachable securing means to bind and prevents their accidental disengagement.

6. A wind screen for vehicles comprising a transparent flexible screen, having a plurality of panels and means uniting said panels together in such a manner that the panels can be collectively bent; an adjustable central support for said screen allowing a limited movement thereof longitudinally of the vehicle, and means for detachably securing the ends of the screen to the vehicle in their bent condition, whereby the reaction due to flexing of the screen causes the detachable securing means to bind and prevents their accidental disengagement.

In witness whereof I affix my signature.

ROBERT CHARLES WILLARD.